United States Patent [19]
Berkovitz

[11] 3,802,274
[45] Apr. 9, 1974

[54] SPEED RESPONSIVE SENSOR
[75] Inventor: Harry Berkovitz, Glenrock, N.J.
[73] Assignee: Westinghouse Electric Corporation, Pittsburgh, Pa.
[22] Filed: July 31, 1972
[21] Appl. No.: 276,488

[52] U.S. Cl............... 73/497, 73/519, 187/39
[51] Int. Cl........................... G01p 3/49, G01p 3/50
[58] Field of Search...... 73/519, 520, 497; 340/263; 187/39, 29 E, 29 G, 29 M; 200/80 R

[56] References Cited
UNITED STATES PATENTS
474,447  5/1892  Gibboney..................... 73/519 X
3,326,326  6/1967  Fink............................ 187/39

Primary Examiner—James J. Gill
Attorney, Agent, or Firm—D. R. Lackey

[57] ABSTRACT

A speed responsive sensor for an elevator system which includes a driving element operated in accordance with the elevator speed, and a driven element driven through a magnetic coupling. The speed sensor is sensitive and accurate at the relatively low elevator speeds to be detected, and at high speeds the relationship of the driving and driven elements is such that the magnetic coupling is automatically reduced to limit heating.

11 Claims, 7 Drawing Figures

SPEED RESPONSIVE SENSOR

BACKGROUND OF THE INVENTION

1. Field of the Invention

The invention relates in general to speed sensors, and more particularly to speed sensors for elevator systems.

2. Description of the Prior Art

There are many instances where it is necessary to determine the speed of an elevator car, for properly controlling the operation thereof. For example, a speed sensor may be used to detect a malfunction which would send the car away from a landing above a certain speed with its doors open. The speed sensor thus may have contacts which are actuated when the car reaches a predetermined speed, typically 30 ft/min., and these contacts may be connected in circuit relation with contacts which indicate whether or not the door is open. When the door is open or opening and the car speed is supposed to be less than 30 ft/min., and the speed sensor indicates the elevator is moving above 30 ft/min., this combination of events may be used to actuate contacts which stop the car and shut it down until maintenance personnel can correct the malfunction.

The speed sensor may also be used to protect maintenance personnel from a malfunction which could cause the car to exceed a predetermined maximum speed when they are operating the elevator car manually from a position on top of the car. When the car is on manual or hand control by maintenance personnel, the top speed desired may typically be about 150 ft/min. Thus, the speed sensor may have contacts which are actuated when the desired top speed for manual control is exceeded, and these contacts may be connected in circuit relation with contacts which indicate the car is on manual control. If the car is on manual control and the desired top speed is exceeded, these contacts may initiate stopping and shutdown of the elevator car.

Still another function of a speed sensor may be to initiate the opening of the car and hatch doors when the car is approaching a landing at which it is to stop. When the car slows down to a predetermined speed, typically about 120 ft/min., the speed sensor may actuate contacts which are connected in the door circuits, and initiate door opening. This door opening function may be initiated by the drop-out of the same switch used to protect maintenance personnel. For example, if this switch is to pick up at a car speed of 150 ft/min., it may be designed to drop out at 120 ft/min., with the drop out actuating contacts in the door circuits.

In all of these applications of the speed sensor, it will be noted that the speed sensor must be sensitive and accurate at relatively low speeds, i.e., speeds in the range of about 30 to 150 ft/min., while the top speed of the elevator car may be as high as about 1800 ft/min.

The eddy current type coupling is desirable in a speed sensor for elevator systems, due to its simplicity and essentially maintenance-free operation. U.S. Pat. No. 3,379,285, which is assigned to the same assignee as the present application, discloses a speed sensor for an elevator system which uses an eddy current coupling. The speed sensor in the aforesaid patent detects overspeed adjacent the terminals. While the speed sensor disclosed in U.S. Pat. No. 3,379,285 operates very well in performing the desired function, it would be desirable to provide a new and improved speed sensor for elevator systems. For example, it would be desirable to provide significant switch acting forces at a low elevator speed, such as 30 ft/min., and yet limit the energy input into the eddy current disc portion of the speed sensor after the elevator exceeds the highest speed to be detected by the speed sensor. This would make it less of a problem in disposing of the heat developed during the operation of the speed sensor. The heat generated in the eddy current coupling increases with the square of the velocity of the eddy current disc when no provision is made to reduce the number of lines of magnetic flux linking the disc.

SUMMARY OF THE INVENTION

Briefly, the present invention is a new and improved speed sensor for an elevator system, which utilizes an eddy current coupling between the driving element and the driven element. The driving and driven elements are disposed to rotate about spaced, parallel axes, with the driven element being disposed to actuate one or more switches, in either direction of rotation thereof, as it moves from a predetermined angular position under the influence of the driving element. Preloaded spring members disposed on the driven element actuate the operating members of snap acting switches, with the preloading being sufficient to actuate all of the switches disposed in either direction of rotation of the driven element. Continued angular movement of the driven element, as the elevator car continues to increase its speed, overcomes the preloading of the spring when the spring contacts a stationary stop member, and the driven member rotates against the bias of the spring member until the magnetic coupling between the driving and driven members is reduced. In other words, the magnet providing the magnetic flux which links the eddy current disc, rotates about the axis of the driven member, until it is driven partially off the edge of the eddy current disc, reducing the number of lines of magnetic flux which links the disc, and thus reducing the heating of the disc, its bearings and associated apparatus.

BRIEF DESCRIPTION OF THE DRAWING

The invention may be better understood, and further advantages and uses thereof more readily apparent when considered in view of the following detailed description of exemplary embodiments, taken with the accompanying drawings, in which.

DESCRIPTION OF THE PREFERRED EMBODIMENTS

Figure 1:
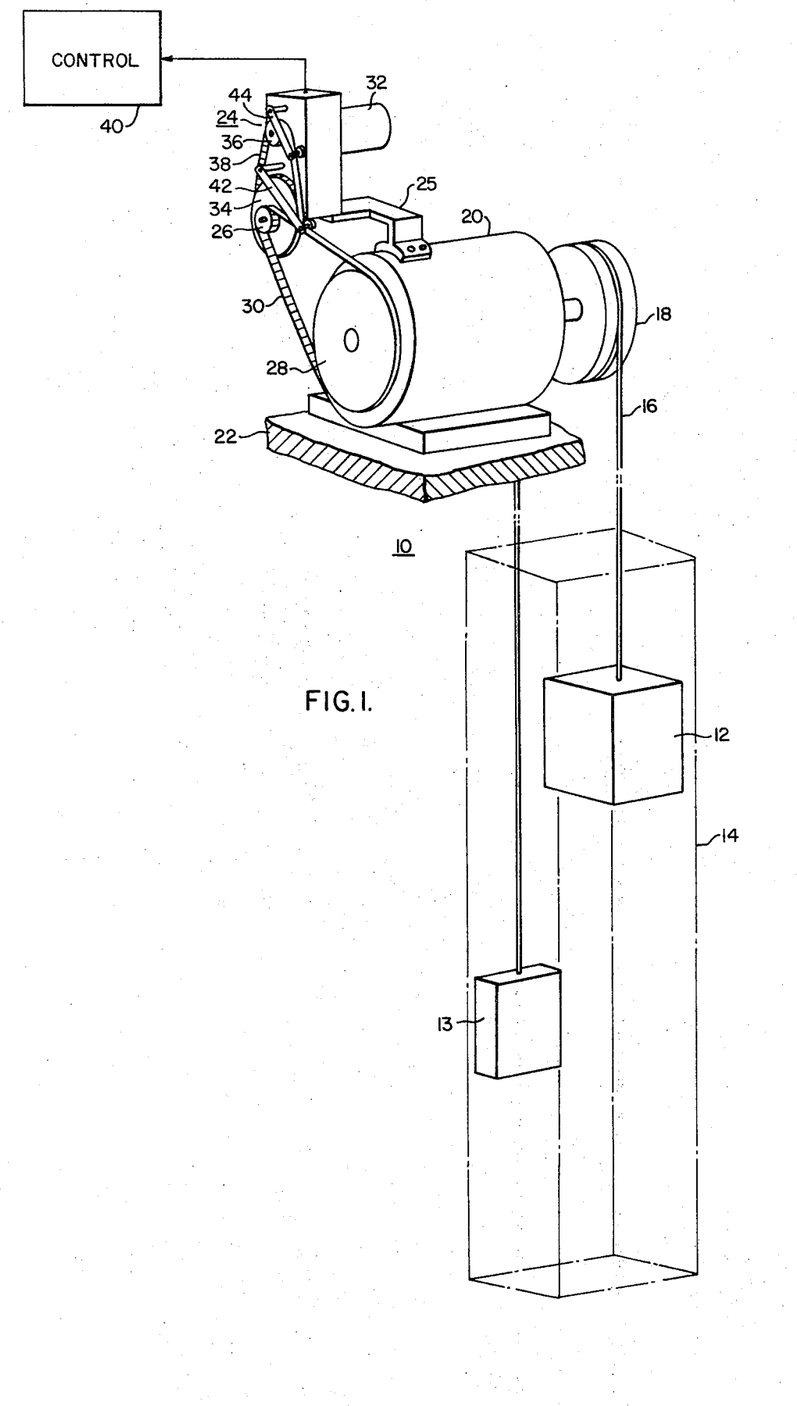
FIG. 1 is a perspective view of an elevator system of the type which may utilize the teachings of the invention, including speed responsive means for sensing the speed of the elevator car.

Referring now to the drawings, and FIG. 1 in particular, there is shown an elevator system 10 of the type which may utilize the teachings of the invention. Elevator system 10 includes an elevator car 12 and counterweight 13, both constrained for movement in the hoistway 14 of a building having a plurality of floors or landings to be served by the car 12. The car 12 and counterweight 13 are connected to suitable elevator roping 16, which is reeved over a traction sheave 18 driven by an elevator drive motor 20. Motor 20 is mounted on a floor 22, which floor may be located in the penthouse of the building served by the elevator system.

The elevator system 10 includes speed sensing means 24 disposed to be driven in accordance with the movement of the elevator car 12. As illustrated, the speed sensing means 24 may be mounted on the motor 20 by any suitable mounting means shown generally at 25, and the speed sensing means 24 and motor 20 may have wheels 26 and 28, respectively, which are coupled by means 30. The means 30 is preferably a timing belt having teeth, in which event the wheels 26 and 28 would be gears. This driving arrangement would provide very little backlash and no slippage, and it would minimize the amount of "hash" or electrical noise in the output of a tachometer 32, which may be mounted on the speed sensing means 24 and connected to the same shaft as the speed sensing means 24.

The wheel 26 driven by motor 20 may be mechanically fixed to a wheel 34, and the wheel 34 is coupled to a wheel 36 on the speed sensing means 24 via coupling means 38. Means 38 is also preferably a timing belt with teeth, and thus wheels 34 and 36 would be gears. As will be hereinafter described, wheel 36 drives a driving element of the speed sensing means 24, and the tachometer 32. The driving element is coupled to a driven element via an eddy current coupling. The driven element actuates one or more switches at predetermined elevator speeds, which switches have contacts connected in electrical control 40, for modifying the operation of the elevator system under certain predetermined conditions.

Slack belt levers 42 and 44 have rollers on their outwardly extending ends which are biased against coupling means 30 and 38, respectively. Should either of the coupling means break, its associated slack belt lever would rotate and operate a switch connected in circuitry designed to take a predetermined course of action when a coupling or timing belt breaks.

Figure 2A:
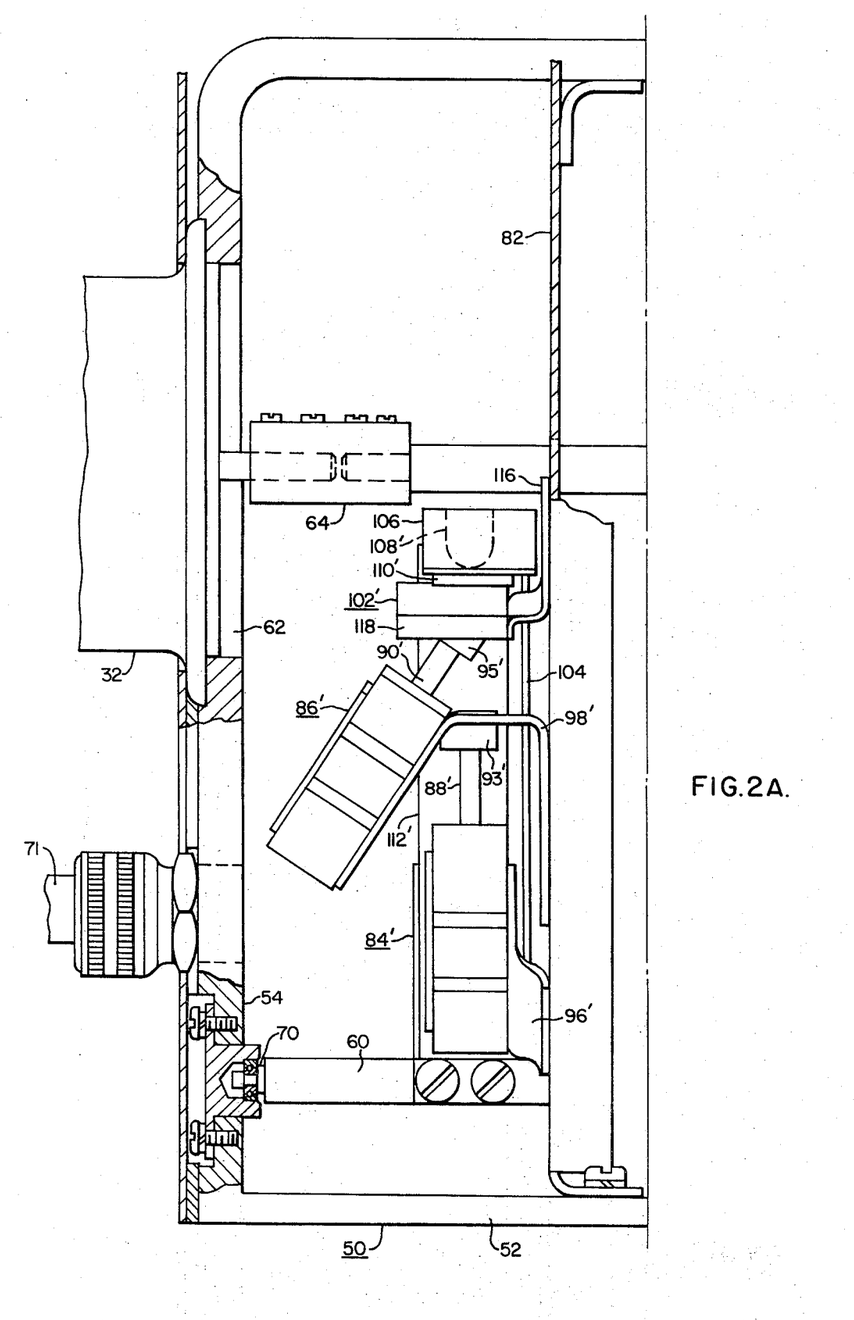
FIGS. 2A and 2B are side elevational views, and FIG. 3 an end elevational view shown partially cut away and partially in section, of speed responsive means constructed according to the teachings of the invention.
Figure 2B:
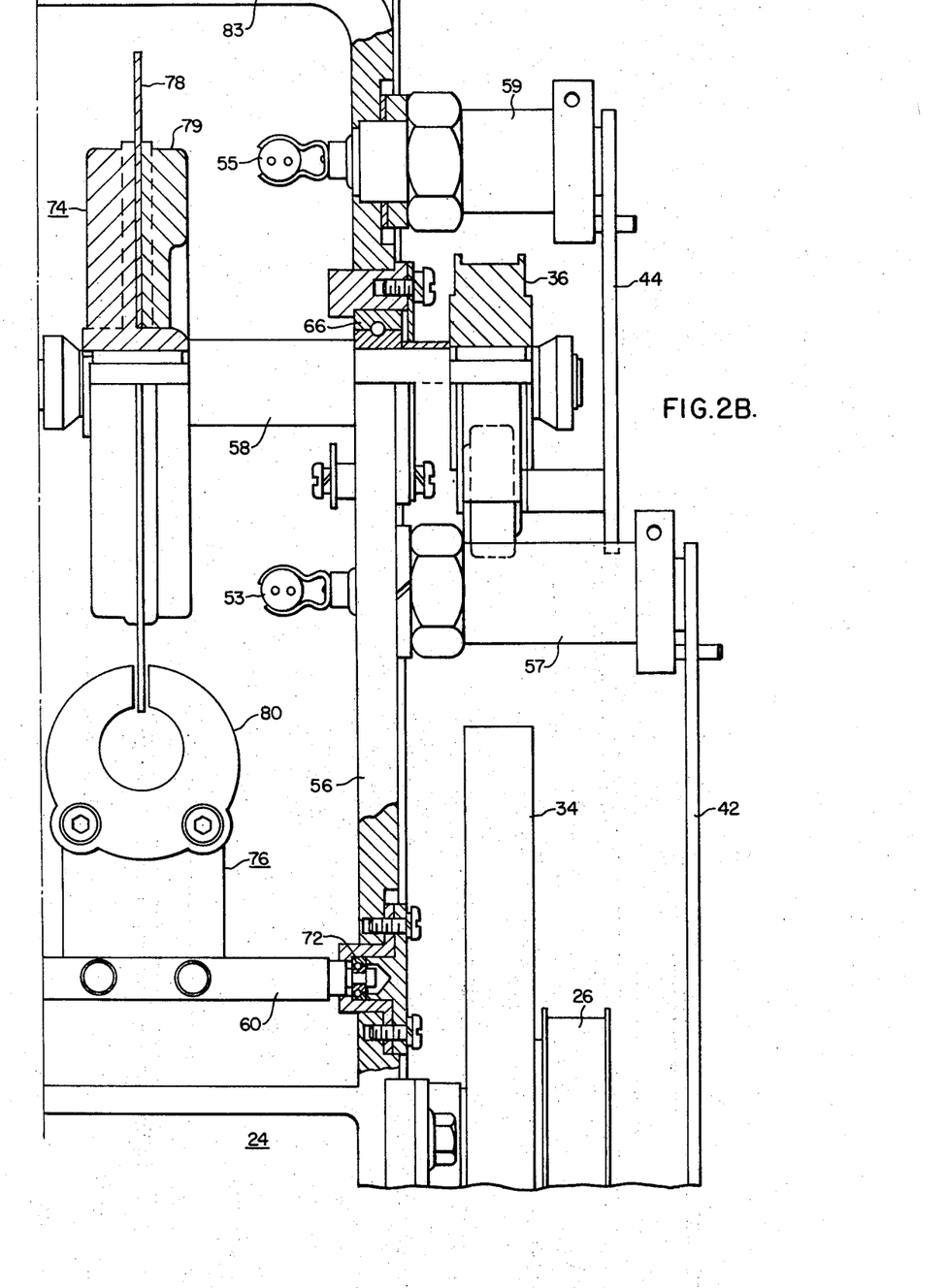
Figure 3:
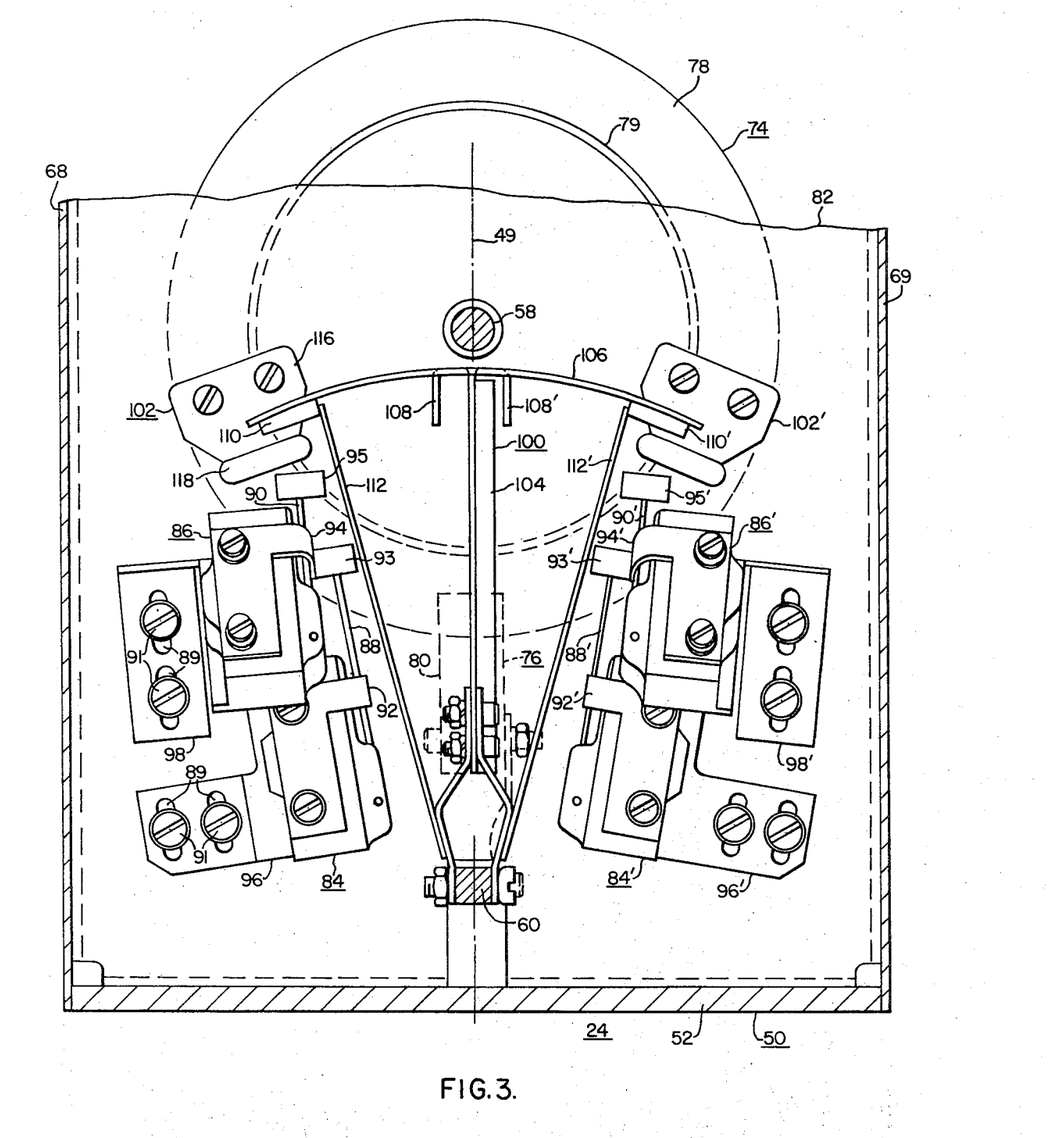

Speed sensing means 24 is shown more clearly in FIGS. 2 and 3, which are side and end elevations thereof, respectively, shown partially cut away and partially in section.

More specifically, speed sensing means 24 includes a supporting structure 50 having a base 52 and spaced pedestals 54 and 56 rising up from the base 52. The wheels 26 and 34, as well as the slack belt levers 42 and 44 are rotatably fixed to an external surface of pedestal 56. The slack belt levers 42 and 44 are disposed to actuate switches 53 and 55, respectively, through sleeve members 57 and 59, respectively, which are fixed to the outer surface of pedestal 56. Switches 53 and 55 may be mercury switches connected to initiate the stopping of car 12 should one of the belts break. Belts 30 and 38 are not illustrated in FIG. 2, in order to more clearly illustrate the driving arrangement.

Speed sensing means 24 includes first and second shafts 58 and 60, respectively, mounted for rotation. The shafts 58 and 60 are spaced, with the axes of the shafts 58 and 60 being parallel with one another and aligned in the same plane, which plane is preferably vertical.

When a tachometer 32 is to be associated with the speed sensing means, and is to be driven by the same coupling as the speed sensing means, pedestal 54 may have an opening 62 therein concentric with the axis of shaft 58. The tachometer 32 is mounted on pedestal 54 with its drive shaft concentric with the opening 62. The drive shaft of the tachometer 32 may be coupled to one end of shaft 58 via a coupling sleeve 64. The other end of shaft 58 extends through an opening in pedestal 56 via a bearing 66, with the wheel 36 being fixed to the outwardly extending end of shaft 58. Rotation of wheels 26 and 34 in response to movement of the elevator car thus rotates wheel 36 and shaft 58 via the timing belts 30 and 38.

Shaft 60 extends between pedestals 54 and 56, and is rotatably supported by bearings 70 and 72 associated with these pedestals.

The first and second shafts 58 and 60 are coupled via an eddy current coupling, which includes a driving element 74 fixed to shaft 58, and a driven element 76 fixed to shaft 60. The driving element 74 includes an electroconductive armature in the form of a circular disc member 78. The flat plane of the disc 78 is perpendicular to the axis of shaft 58, with the disc being mounted in the enclosure formed by the upstanding pedestals 54 and 56 and a pair of cooperating side members 68 and 69. Disc 78 is constructed of an electroconductive material, such as aluminum or copper. The disc 78 is accurately held by a heavier but smaller diameter member 79, which member also functions as a heat sink, rapidly removing heat generated in the disc 78.

The driven element 76 includes means 80 for producing a magnetic field in which a portion of the disc 78 rotates, such as a C-shaped permanent magnet having a high coersive force. The disc 78 has a peripheral portion located between the pole pieces of magnet 80 when the shaft 60 and the driven element 76 are in a predetermined angular location, such as with the vertical center line of the magnet 80, as illustrated in the end elevational view of FIG. 3, being located on an imaginary line 49 drawn between, and perpendicular to, the axes of shafts 58 and 60.

A plurality of switch members to be actuated by the movement of the driven element 76 are disposed intermediate the pedestals 54 and 56, such as on a wall member 82. Wall member 82 is secured to the base 52, to side members 68 and 69, and also to a cover portion 83. The major surfaces of wall member 82 are parallel with the major surfaces of the pedestals 54 and 56. Wall member 82 includes suitably located openings through which the shaft members 58 and 60 pass. A terminal board (not shown) may also be mounted on wall member 82, to which electrical leads from the switches, and external leads shown generally at 69, may be connected.

Since in an elevator system it is desired to determine the speed of the elevator car in both the up and down direction, separate switches are used for each direction of travel. The number of switches used for each travel direction depends upon the number of specific speeds to be detected. For purposes of example, it will be assumed that two different speeds will be detected as the elevator car accelerates, requiring two switches for each travel direction. The ratio between the pick up and drop out speeds of the switches may be designed to provide additional speed indications during deceleration, such as to initiate the door opening function during normal slowdown, as hereinbefore mentioned. Thus, two switches 84 and 86 are disposed on one side of the imaginary line 49, as illustrated most clearly in FIG. 3, and two switches 84' and 86' are disposed on the other side of line 49. Since the switches 84' and 86' are similar to switches 84 and 86, and the placement of switches 84' and 86' on one side of the line 49 is similar to the placement of switches 84 and 86, respectively, on the other side of the line, only switches 84 and 86 and their placement will be described in detail.

Switches 84 and 86 are preferably snap-acting microswitches having actuating arms 88 and 90, respectively which provide relatively high contact forces for reliability and vibration resistance, but which may be actuated by a relatively low actuating force, such as 40 grams. The snap acting microswitch is also extremely fast acting, which is essential in elevator speed sensors. The "pick up" of a snap acting microswitch is thus when the switch "snaps" from one condition to the other, and the "drop out" is when it snaps back to its unactivated condition.

In order to reduce the amount of angular movement required by the driven element 76 to sequentially actuate the switches 84 and 86 as the driven element moves counterclockwise, as viewed in FIG. 3, the actuating arms 88 and 90 of switches 84 and 86 may be precompressed by bracket members 92 and 94, respectively.

Switches 84 and 86 are mounted on wall member 82 via mounting members 96 and 98, respectively, which mounting members have slotted openings 89 therein for receiving screws 91, to provide the desired rough adjustment in the placement of the switches. The final close adjustment is provided by rollers 93 and 95 which are adjustably mounted on the ends of arms 88 and 90, respectively. Rollers 93 and 95 are adjustable along the longitudinal axes of arms 88 and 90, respectively, such as by adjustment screws, to adjust the lengths of the torque arms. It will be assumed that switch 84 is to be operated at a lower speed than switch 86, and thus it must be mounted such that angular movement of the driven member will first actuate operating arm 88, and then operating arm 90. Further, the sequential actuation of these arms to the "snap" point of its associated switch must occur at the desired predetermined speeds of the elevator. The tachometer 32 may be used to properly place the switches such that they are actuated from one condition to another condition at the desired RPM of the disc 78, which RPM is directly related to the speed of the elevator car.

The driven element 76 must by yieldably biased to the position shown in FIGS. 2 and 3, when the elevator car is at rest, i.e., with the vertical center line of the magnet, as illustrated in FIG. 3, intersecting the axes of shafts 58 and 60 along the imaginary line 49. Angular movement of the driven element 76 from this "at rest" position, must sequentially actuate the switches located in the circumferential direction of movement at the predetermined desired speeds, and the switches must be maintained in their actuated position as long as the car speed is above the speeds at which the switches are to be returned to their unactuated condition as the elevator car slows down. As hereinbefore stated the switches may be designed to return to new unactuated conditions at lower speeds than those at which they were actuated, as the elevator car decelerates to stop at a landing. Further, according to the teachings of this invention, the magnetic coupling between the magnet 80 and the disc 78 is reduced following the actuation of the switches, to limit the heating of the disc 78 at the higher elevator speeds. For example, switch 84 may be disposed to operate at a car speed of about 30 ft/min., and switch 86 may be disposed to operate at a car speed of about 150 ft/min., while the top speed of the elevator may be 1800 ft/min. The relatively low RPM of the disc 78 at which the first switch 84 must be operated, such as about 33 RPM on high speed elevator systems, would cause a very high energy input to the disc at the highest elevator speed, which presents quite a problem of heat removal.

The functions of (1) yieldably biasing the driven element 76 to the desired angular location, (2) actuating the switches as the driven element is rotated from the predetermined angular location under the influence of rotation of the disc 78, and (3) decoupling the magnet 80 and disc 78 at a predetermined elevator speed, are provided by a T-bar assembly 100 secured to shaft 60 and by stop members 102 and 102'.

T-bar assembly 100 includes a substantially T-shaped structure having a portion 104 fixed to shaft 60, a curved upper member 106 fixed to the outwardly extending upper end of portion 104, first and second tab members 108 and 108', respectively, first and second stop members 110 and 110', respectively, and first and second flat, cantilever spring members 112 and 112'.

Portion 104 has one of its ends fixed to shaft 60 such that when viewed in the direction shown in FIG. 3 its vertical center line intersects the axes of shafts 58 and 60 along line 49, when the driven element is in the angular position which indicates zero car speed.

The curved upper member 106 is disposed such that as the driven element 76 is rotated, member 106 will move on an imaginary circle whose center coincides with the axis of shaft member 60. Member 106 has its midpoint fixed to the end of portion 104, and is thus symmetrical about the line 49.

The tab members 108 and 108' extend downwardly from member 106 on opposite sides of portion 104, and they are spaced therefrom by a predetermined like distance.

Stop members 110 and 110' are fixed to the under side of curved member 106, adjacent to its outwardly extending ends.

Figure 4:
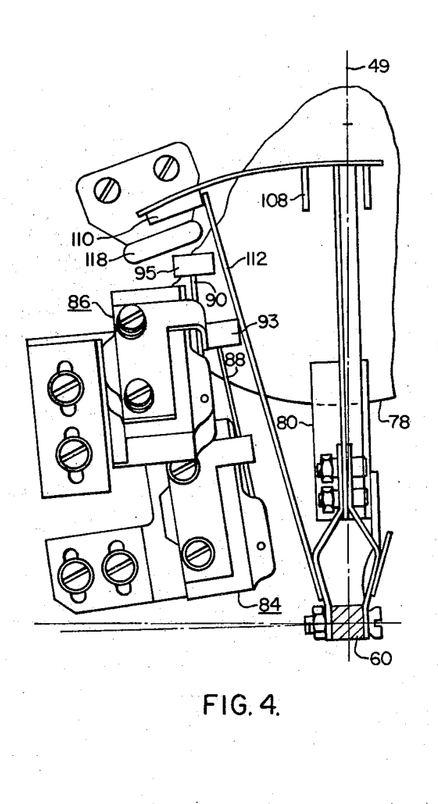
FIGS. 4, 5 and 6 are fragmentary views of the speed responsive device shown in FIGS. 2 and 3, illustrating certain operating positions thereof.
Figure 5:
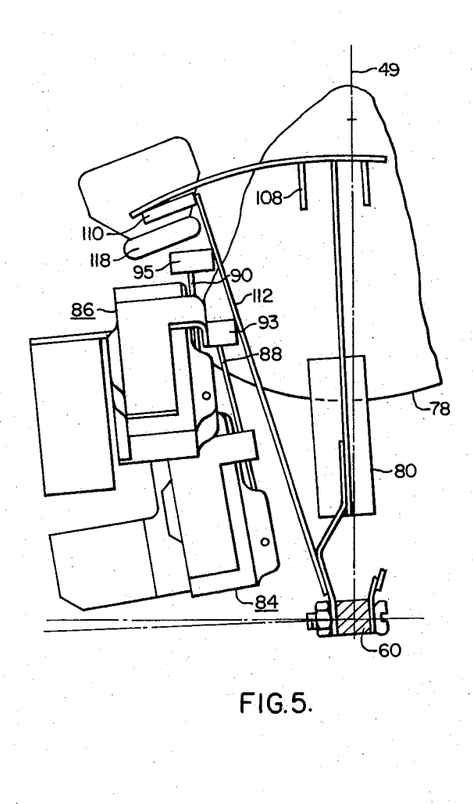
Figure 6:
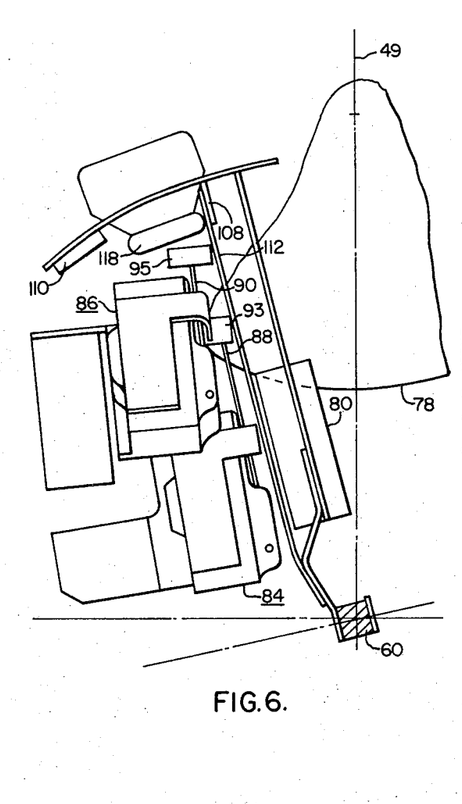

The flat, contilever spring members 112 and 112' are fixed to T-bar assembly 100, extending outwardly from the vicinity of shaft 60 from opposite sides of portion 104. Spring members 112 and 112' are preloaded against stop members 110 and 110', respectively, with the preloading force being sufficient to maintain the springs against their respective stop members when the shaft 60 rotates and directs, for example, spring member 112 such that it sequentially strikes and actuates rollers 93 and 95 connected to the operating arms 88 and 90 of switches 84 and 86, respectively. FIGS. 4 and 5 illustrate counterclockwise rotation of shaft 60 such that spring 112 first actuates switch 84, as shown in FIG. 4, and then switch 86, as shown in FIG. 5. The wall member 82 is not shown in FIGS. 4, 5 and 6, in order to more clearly illustrate the relationship of the magnet 80 and the disc 78.

Continued rotation of the driven element 76 and thus shaft 60 causes spring member 112 to strike the stop assembly 102. Stop assembly 102 includes a mounting member 116, which is fixed to wall member 82, and a stop member 118 which is positioned to contact spring member 112 just after spring member 112 has actuated the operating arm 90 of switch 86 to its operated position. As the elevator car continues to accelerate towards its maximum speed, the spring member 112 remains against stop member 118, maintaining switches 84 and 86 in their actuated conditions, but the remaining portion of the driven element 76, including magnet 80, continues to rotate against the bias of spring 112 until the pole pieces of magnet 80 are driven partially off of the edge of disc 78. This arrangement reduces the number of lines of magnetic flux which cut the disc 78, reducing the force which drives the driven member, and reduces the heating loss in the disc 78. The moving of the pole pieces of magnet 80 partially off of the edge of disc 78, while the spring member 112 is disposed against stop 118, is illustrated in the fragmentary view of the speed sensor shown in FIG. 6. The maximum angular movement of the magnet 80 is limited by the tabs 108 and 108', with tab 108 contacting spring member 112 when the angular limit in one circumferential direction is reached.

When the elevator car slows down, the bias provided by spring 112 against stop 118 returns the driven element to the position where the spring 112 is once again against stop 110, and the remaining bias of the driven assembly back to its "at rest" position, is provided by the actuating members 88 and 90 of the switches 84 and 86. Thus, one of the spring members 112 and 112' actually rests against an actuating arm of a switch when the elevator car is stopped, due to gravity. The preferred location of the axes of shaft members 58 and 60 such that the shaft 60 of the driven element 76 is vertically below the shaft 58 of the driving element 74 aids in the operation of the speed sensor, as gravity assists the movement of the driven element and reduces the time lag which would otherwise be present due to slippage upon startup of the eddy current coupling.

The operation of the switches 84' and 86', disposed on the other side of the line 49, by movement of the spring member 112' against their operating arms, and the automatic decoupling of the magnet 80 from the disc 78 for clockwise rotation of the shaft 60, is similar to that hereinbefore described relative to the counterclockwise rotation of the shaft 60.

In summary, there has been disclosed a new and improved speed sensor for an elevator system which uses an eddy current coupling. The new and improved speed sensor has the required sensitivity to relatively low elevator speeds, but effectively limits energy input at high speeds, due to the "de-clutching" arrangement whereby the magnetic field linking the disc or armature is reduced when a predetermined elevator speed is reached. The speed sensor closely follows the speed of the elevator car, and when a timing belt coupling is used between the elevator drive motor and speed sensor, there is a minimum of backlash and slippage, enabling a tachometer to also be driven from the same shaft as the speed sensor with a minimum of electrical noise in the tachometer output due to the type of drive arrangement used. The use of snap-acting microswitches as the switching device provides high contact forces and immunity from vibration induced closure, as well as the desired fast switching action. The disclosed construction facilitates manufacture and assembly of the speed sensor, with the unit type housing construction disclosed promoting easy alignment of the disc, magnet, and tachometer.

I claim as my invention:

1. A speed responsive device, comprising:
a supporting structure,
an electroconductive element,
a magnetic field producing element,
said electroconductive and magnetic field producing elements being mounted for rotation on said supporting structure on first and second spaced, parallel axes, respectively, with the spacing being selected such that said magnetic field producing element establishes a magnetic field which links said electroconductive element when said magnetic field producing element is in a predetermined angular location about its axis,
means yieldably biasing said magnetic field producing element to said predetermined angular location, including spring means mounted for movement with said magnetic field producing element and switch means mounted on said supporting structure,
and means for translating a predetermined external movement to rotation of said electroconductive element, with the rotation of said electroconductive element producing angular movement of said magnetic field producing element due to their magnetic coupling,
said spring means actuating said switch means in response to a predetermined angular movement of said magnetic field producing element, with said spring means and said switch means cooperating to return said magnetic field producing element to said predetermined angular location when said electroconductive element ceases to rotate.

2. The speed responsive device of claim 1 including first stop means mounted for movement with the magnetic field producing element, and wherein the spring means is preloaded against said first stop means, with the preloading of the spring means being selected to enable the spring means to actuate said switch means with a force which opposes the preloading of the spring means against said first stop means, but which is less than the preloading at the time of switch actuation, to maintain the spring means against said first stop means.

3. The speed responsive device of claim 2 wherein the switch means includes a plurality of switches and associated operating members, with the preloading of the spring means being sufficient to sequentially actuate the operating members of said plurality of switches while maintaining the position of the spring means against said first stop means.

4. The speed responsive device of claim 2 including second stop means, said second stop means being disposed on said supporting structure such that the spring means contacts said second stop means when the magnetic field producing element reaches a predetermined angular location following the actuation of the switch means, said second stop means preventing further movement of the spring means away from the predetermined angular location while enabling further rotational movement of the magnetic field producing element against the bias of the spring means.

5. The speed responsive device of claim 1 wherein the spring means includes first and second spring members, and the switch means includes first and second switch means.

6. The speed responsive device of claim 5 wherein the first switch means includes an operating arm which yieldably resists movement of the first spring member in a predetermined rotational direction, and the second switch means includes an operating arm which yieldably resists movement of the second spring member in the opposite rotational direction.

7. The speed responsive device of claim 5 wherein the first and second switch means each include a plurality of switches and associated operating arms disposed to yieldably resist movement of the first and second spring members when the first spring member moves in one circumferential direction, and when the second spring member moves in the opposite circumferential direction, respectively.

8. The speed responsive device of claim 7 wherein the plurality of switches and operating arms of each switch means are disposed to be sequentially operated by its associated spring member.

9. The speed responsive device of claim 5 including first and second stops mounted for movement with the magnetic field producing element, and wherein the first and second spring members are preloaded against said first and second stops, respectively, with the preloading of the first and second spring members being sufficient to actuate the first and second switch means, respectively, while maintaining the positions of the first and second spring members against their associated stops.

10. The speed responsive device of claim 9 including third and fourth stops, said third and fourth stops being disposed on the supporting structure such that the first and second spring members contact said third and fourth stops after actuating the first and second switch means, respectively, disengaging the first and second spring members from the first and second stops, respectively, and permitting the magnetic field producing element to continue rotation against the bias of the disengaged spring member until reaching an angular position at which the magnetic field linking the electroconductive element is insufficient to move the magnetic field producing element against the bias of the disengaged spring member.

11. An elevator system, comprising:
an elevator car,
means constraining the elevator car for movement in a predetermined path,
controllable means for moving the elevator car in said path,
and speed responsive means comprising a supporting structure,
an electroconductive element, and a magnetic field producing element, said electroconductive and magnetic field producing elements being mounted for rotation on said supporting structure on first and second spaced, parallel axes, respectively, with the spacing being selected such that said magnetic field producing element establishes a magnetic field which links said electroconductive element when said magnetic field producing element is in a predetermined angular location about its axis, means including first and second spring members mounted for movement with said magnetic field producing element and first and second switch members mounted on said supporting structure yieldably biasing said magnetic field producing element to said predetermined angular location, and means for translating movement of the elevator car to rotation of said electroconductive element, with the rotation of said electroconductive element producing angular movement of said magnetic field producing element due to their magnetic coupling, said first and second spring members actuating said first and second switch members, respectively, in response to predetermined first and second rotational movements, respectively, of said magnetic field producing element, with said first and second spring members and said first and second switch members cooperating to return said magnetic field producing element to said predetermined angular location when said electroconductive element ceases to rotate.

* * * * *